(12) United States Patent
Bodapati et al.

(10) Patent No.: US 7,185,086 B2
(45) Date of Patent: Feb. 27, 2007

(54) METHOD FOR ELECTRONIC TRACKING OF AN ELECTRONIC DEVICE

(75) Inventors: Ramesh Bodapati, San Jose, CA (US); Edgar Circenis, Loveland, CO (US); Carol Uno, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/184,684

(22) Filed: Jun. 26, 2002

(65) Prior Publication Data

US 2004/0010581 A1 Jan. 15, 2004

(51) Int. Cl.
G06F 15/173 (2006.01)
G06F 15/177 (2006.01)

(52) U.S. Cl. .................. 709/224; 709/220

(58) Field of Classification Search .......... 709/220, 709/224
See application file for complete search history.

(56) References Cited

U.S. PATENT DOCUMENTS

| | | | |
|---|---|---|---|
| 5,455,927 A | 10/1995 | Huang | |
| 5,479,612 A | 12/1995 | Kenton et al. | |
| 5,530,749 A | 6/1996 | Easter et al. | |
| 5,727,155 A * | 3/1998 | Dawson | 709/205 |
| 6,065,081 A | 5/2000 | Stancil et al. | |
| 6,094,702 A | 7/2000 | Williams et al. | |
| 6,195,676 B1 * | 2/2001 | Spix et al. | 718/107 |
| 6,366,950 B1 * | 4/2002 | Scheussler et al. | 709/206 |
| 6,453,344 B1 * | 9/2002 | Ellsworth et al. | 709/220 |
| 6,647,434 B1 | 11/2003 | Kamepalli | |
| 6,662,284 B2 | 12/2003 | Gold | |
| 6,697,942 B1 * | 2/2004 | L'Heureux et al. | 713/152 |
| 6,725,317 B1 * | 4/2004 | Bouchier et al. | 710/312 |
| 6,912,493 B1 | 6/2005 | Scheel et al. | |
| 6,918,052 B2 * | 7/2005 | Bouchier et al. | 714/4 |
| 6,986,137 B1 * | 1/2006 | King et al. | 718/104 |
| 2002/0019852 A1 * | 2/2002 | Bahar | 709/206 |
| 2002/0073304 A1 | 6/2002 | Marsh et al. | |
| 2002/0077856 A1 | 6/2002 | Pawlikowski et al. | |
| 2002/0124168 A1 | 9/2002 | McCown et al. | |
| 2002/0188704 A1 | 12/2002 | Gold et al. | |
| 2003/0115157 A1 * | 6/2003 | Circenis | 705/400 |
| 2003/0135474 A1 * | 7/2003 | Circenis et al. | 705/400 |

(Continued)

FOREIGN PATENT DOCUMENTS

GB 2346986 A 8/2000

(Continued)

OTHER PUBLICATIONS

Instant Capacity on Demand (ICOD), Chapter 21; Apr. 2003; pp. 1-11.

(Continued)

Primary Examiner—David Wiley
Assistant Examiner—J. Bret Dennison

(57) ABSTRACT

A method for electronic tracking of an electronic device. Identifying information is received about the electronic device, wherein the identifying information uniquely identifies the electronic device. An electronic transmission is received from the electronic device. Provided the electronic transmission is a request to access a component of the electronic device, an access key is transmitted to a system contact, wherein the access key is for providing access to the component.

21 Claims, 4 Drawing Sheets

U.S. PATENT DOCUMENTS

| | | |
|---|---|---|
| 2003/0135580 A1 | 7/2003 | Camble et al. |
| 2003/0135750 A1 | 7/2003 | Circenis |
| 2004/0003063 A1 | 1/2004 | Ashok et al. |
| 2004/0010581 A1 | 1/2004 | Dodapati et al. |
| 2004/0176943 A1* | 9/2004 | Gentile et al. ............... 703/27 |
| 2004/0249763 A1* | 12/2004 | Vardi ......................... 705/59 |

FOREIGN PATENT DOCUMENTS

| | | |
|---|---|---|
| WO | WO01/46788 | 6/2001 |
| WO | WO 01/61485 | 8/2001 |

OTHER PUBLICATIONS

"Tweaktown Bios Tuning Guide"; Feb. 26, 2002 at www.tweaktown.com/articles/192/print/index.html; pp. 1-10.

"MG Powertweak 2.02 Revision 010"; Jan. 22, 2002 at www.majorgeeks.com/download428.html; pp. 1-2.

iSeries Model 840 manual; "V5RI Planning Guide for Capacity Upgrade on Demand"; IBM; Oct. 10, 2001; pp. 1-29.

Cutler, et al.; "IBM eserver pSeries 680 Handbook Including RS/6000 Model S80"; IBM; Dec. 2000; various pages.

IBM; "Capacity Upgrade on Demand Installing and Upgrading Processors"; Mar. 2001; pp. 1, 13-15.

Lutz, Stephen; "IBM eserver pSeries 660 Model 6M1 Technical Overview and Introduction"; Sep. 4, 2001; pp. 6, 2-23.

Hewlett-Packard Co.; "Technical Specifications for the HP 9000 Superdome Enterprise Server"; May 2001.

Spectra Logic; "Spectra Logic Indtroduces Capacity on Demand Tape Libraries"; Nov. 20, 2001.

Morgan, Timothy Prickett; "IBM Improves Its Capacity on Demand for iSeries Servers"; May 20, 2002.

Morgan, Timothy Prickett; "iSeries May Get All Kinds of Capacity on Demand Options"; May 28, 2002.

\* cited by examiner

METHOD FOR ELECTRONIC TRACKING OF AN ELECTRONIC DEVICE

FIELD OF INVENTION

Various embodiments of the present invention relate to the field of electronic communications.

BACKGROUND OF THE INVENTION

Computer resource requirements of an organization (e.g., business, corporation, or educational institution) often vary from month to month. In particular, it is common for an organization to anticipate computing resource requirements in the near future that exceed its current computing needs. For example, an organization may currently need only four computer processing units (CPUs) to run its web servers, but anticipate requiring a total of eight CPUs in three months time. When this situation occurs, the organization typically has two options. For one, the organization may purchase all eight CPUs initially. However, this may not be feasible due to the cost of the additional four CPUs if, for example, the organization does not have the financial resources to purchase the additional CPUs. Alternatively, the organization can buy the four CPUs currently required, and modify their system at a later date when the need arises for the additional CPUs. Unfortunately, this typically requires modification to the organization's computer resources (e.g., restructuring the computer network), and results in additional expense to the organization.

Recently, developments in computer system technology have allowed for an organization to design computer systems with more CPUs than are currently needed, while paying for only those that are being used. For example, the Hewlett Packard Instant Capacity on Demand (iCOD) program provides customers with instant access to CPU resources beyond the amount initially purchased for their system.

In one iCOD model, a customer receives a system with more CPUs than are actually purchased. In particular, the customer receives the CPUs purchased and a specified number of reserve CPUs. At a later time, the customer activates the reserve CPUs according to system resource requirements. Once the organization activates a reserve CPU, they are then charged for the CPU. Thus, an organization can plan for future CPU capacity requirements without having to pay for the CPUs in advance.

In order to ensure payment for activated reserve CPUs, it is necessary to track customer usage of the iCOD CPUs. Currently, an audit application has been implemented to track customer usage of the iCOD CPUs. Each iCOD system is designed to periodically send an electronic mail message to the audit application detailing the usage of the reserve CPUs.

However, in order to receive the electronic mail message, the customer must configure the iCOD system with a network for sending electronic mail. If the customer does not properly configure the iCOD system for sending electronic mail, the audit application is unable to track the usage of the reserve CPUs.

SUMMARY OF THE INVENTION

A method for electronic tracking of an electronic device is presented. Identifying information is received about the electronic device, wherein the identifying information uniquely identifies the electronic device. An electronic transmission is received from the electronic device. Provided the electronic transmission is a request to access a component of the electronic device, an access key is transmitted to a system contact, wherein the access key is for providing access to the component.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE(S) FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
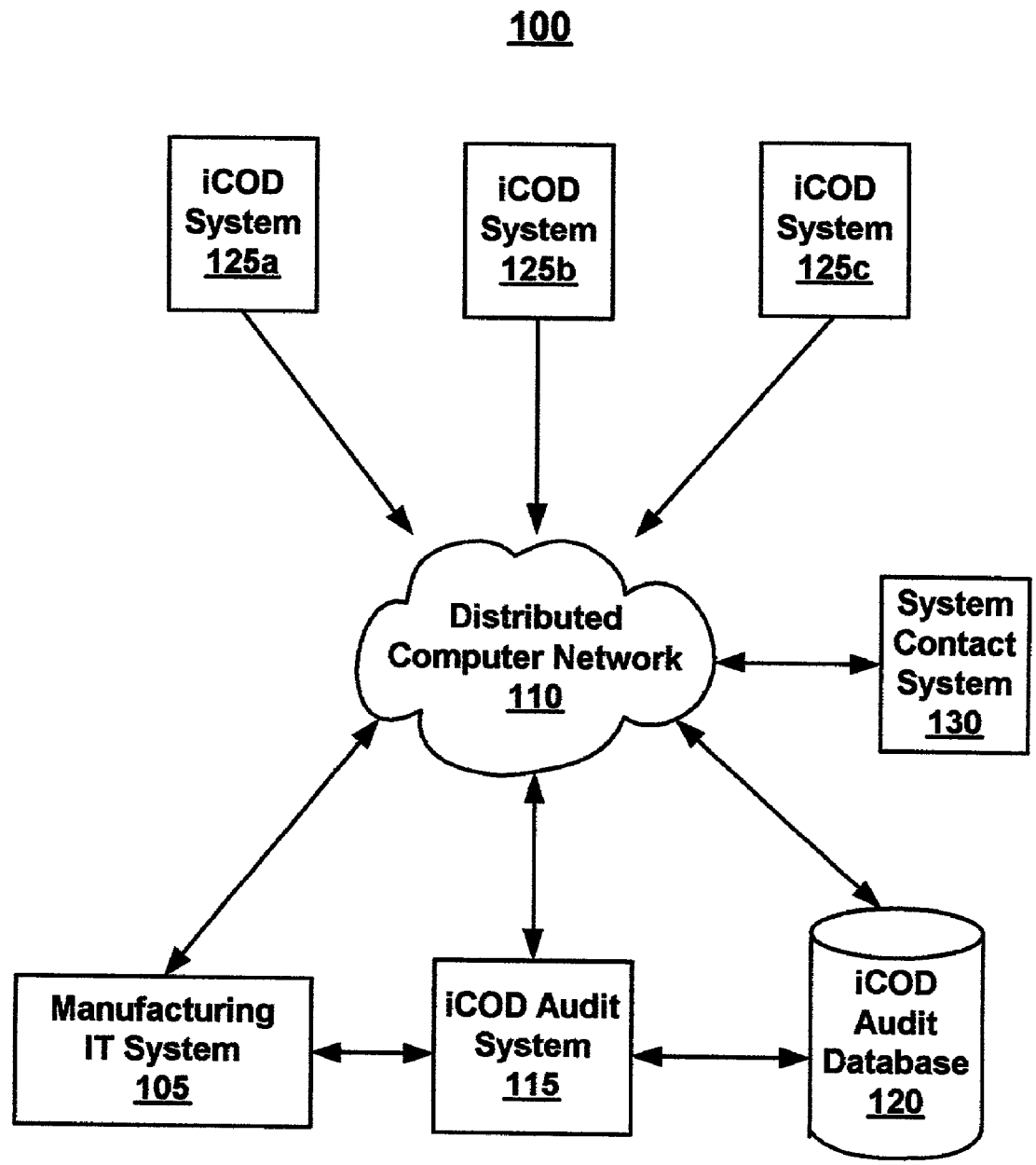
FIG. 1 is a block diagram of an exemplary distributed computer network upon which embodiments of the present invention may be practiced.

FIG. 1 is a block diagram 100 of an exemplary distributed computer network 110 upon which embodiments of the present invention may be practiced. Distributed computer network 110 is communicatively coupled to instant capacity on demand (iCOD) audit system 115 and at least one customer iCOD system (e.g., iCOD systems 125a–c). It should be appreciated that any number of iCOD systems can be communicatively coupled to computer network 110, and that the number of iCOD systems of diagram 100 is exemplary. In one embodiment, computer network 110 is the Internet. In another embodiment, computer network 110 is an intranet. In another embodiment, computer network 110 is a local area network (LAN). It should be appreciated that computer network 110 can be any network which supports electronic communications between a plurality of computer systems.

In one embodiment, iCOD audit system 115 is communicatively coupled to manufacturing information technology (IT) system 105. In one embodiment, iCOD audit system 115 is communicatively coupled to manufacturing IT system 105 over computer network 110. In another embodiment, iCOD audit system 115 is communicatively coupled to manufacturing information technology IT system 105 over a direct connection.

In one embodiment, iCOD audit system 115 is communicatively coupled to iCOD audit database 120. In one embodiment, iCOD audit system 115 is communicatively coupled to iCOD audit database 120 over computer network 110. In another embodiment, iCOD audit system 115 is communicatively coupled to iCOD audit database 120 over a direct connection. In another embodiment, iCOD audit database 120 is comprised within iCOD audit system 115.

In one embodiment, computer network 110 is communicatively coupled to system contact system 130. In one embodiment, system contact system 130 is a computer system. In one embodiment, system contact system 130 comprises a software application for sending and receiving electronic transmissions (e.g., electronic mail). In one embodiment, a user of system contact system 130 has access to iCOD systems 125a–c.

Figure 2:
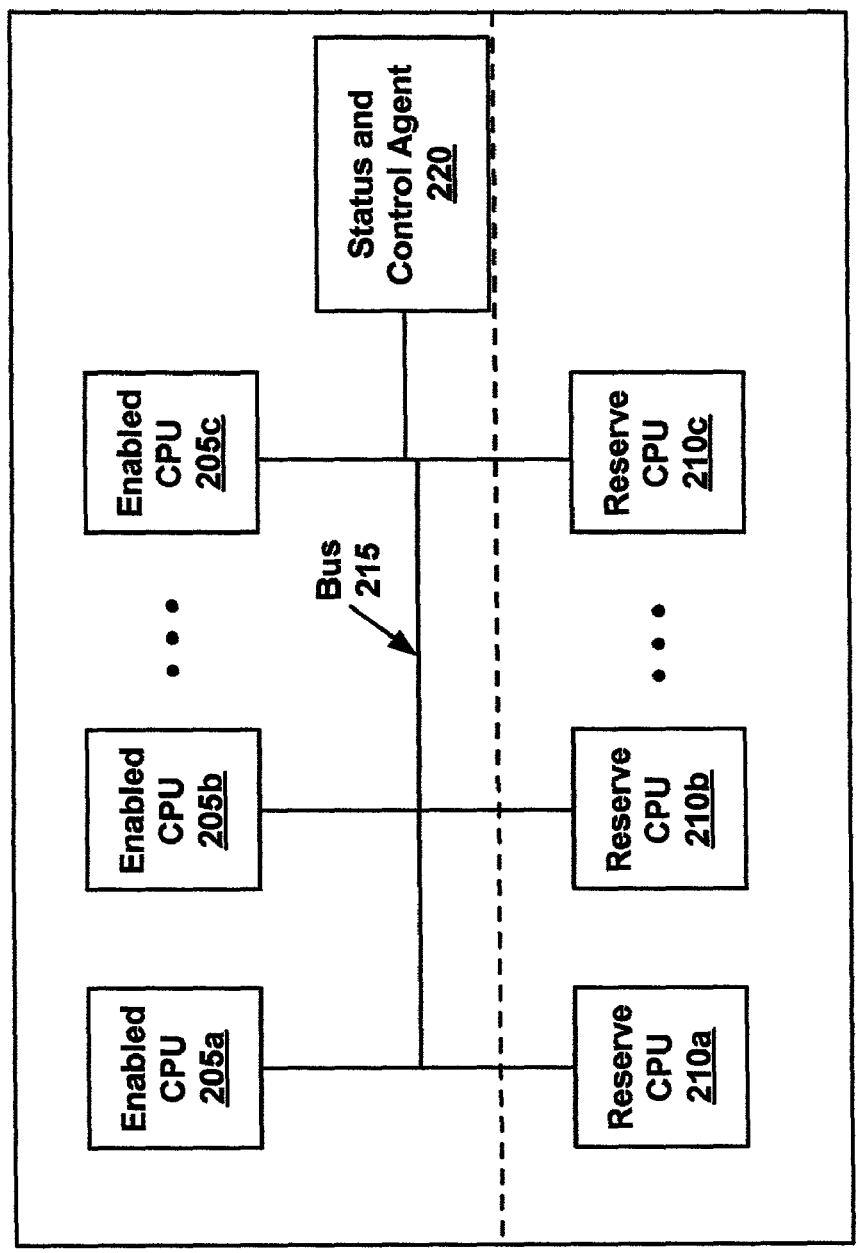
FIG. 2 is a block diagram of an exemplary iCOD computer system in accordance with one embodiment of the present invention.

FIG. 2 is a block diagram of an exemplary iCOD computer system 125 in accordance with one embodiment of the present invention. In one embodiment, an iCOD computer system comprises a plurality of components, wherein at least one component is enabled and one component is reserved for future use. It should be appreciated that the component may comprise, but are not limited to: processors, additional memory, input/output devices, cells for cellular communication, and other peripheral devices.

In one embodiment, as shown at FIG. 2, iCOD computer system 125 comprises a plurality of CPUs (e.g., processors), wherein at least one CPU is enabled (e.g., enabled CPUs 205a–c) and at least one CPU is reserved for future use (e.g., reserve CPUs 210a–c). In one embodiment, enabled CPUs 205a–c and reserve CPUs are connected via bus 215. It should be appreciated that iCOD computer system 125 can comprise any number of enabled CPUs and reserve CPUs, and that the embodiment shown in FIG. 2 is exemplary with respect to the number of enabled CPUs and reserve CPUs.

In one embodiment, iCOD computer system 125 comprises status and control agent 220 communicatively coupled to enabled CPUs 205a–c and reserve CPUs 210a–c via bus 215. In one embodiment, status and control agent 220 is a software application that operates to periodically transmit an electronic transmission to an iCOD audit system regarding the status of the iCOD system. In one embodiment, status and control agent 220 transmits electronic messages regarding whether or not the reserve CPU has been activated. In order for the iCOD audit system to receive an electronic message from a status agent, it is necessary that a network connection be configured for the iCOD system.

In one embodiment, an enabled CPU is available for use upon receipt of iCOD computer system 125. Conversely, in one embodiment, a reserve CPU is not immediately available for use. In one embodiment, an access key (e.g., license key) must be entered into status and control agent 220 in order to access any other functionality of the reserve CPU. In one embodiment, a system administrator or a system contact enters the access key. With reference to FIG. 1, in one embodiment, in order to receive an access key an electronic message must be sent to iCOD audit system 115 from an iCOD system (e.g., iCOD system 125a).

With reference to FIG. 2, in one embodiment, iCOD system 125 comprises a status and control application. In one embodiment, the status and control application is operable to transmit periodic status reports to an iCOD audit system (e.g., iCOD audit system 115 of FIG. 1). In one embodiment, the status reports are sent via electronic mail (email).

Figure 3:
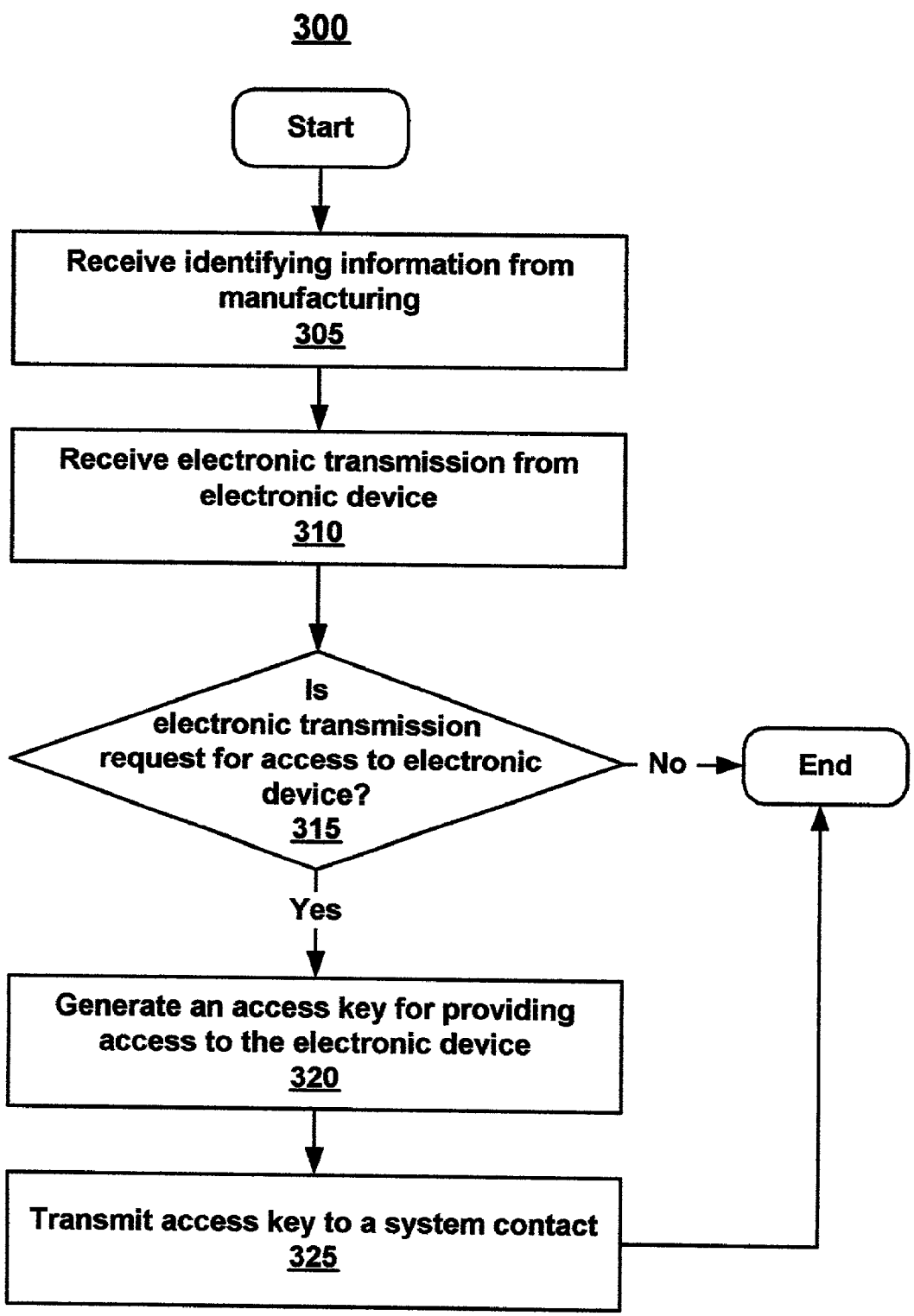
FIG. 3 is a flow chart illustrating steps in a process for electronic tracking of an electronic device in accordance with one embodiment of the present invention.

FIG. 3 is a flow chart illustrating steps in a process 300 for electronic tracking (e.g., monitoring) of an electronic device in accordance with one embodiment of the present invention. In one embodiment, process 300 is carried out by processors and electrical components under the control of computer readable and computer executable instructions. In one embodiment, process 300 is carried out by iCOD audit system of FIG. 1. Although specific steps are disclosed in process 300, such steps are exemplary. That is, the embodiments of the present invention are well suited to performing various other steps or variations of the steps recited in FIG. 3.

At step 305 of process 300, identifying information (e.g., identification data) is received in regard to an electronic device. In one embodiment, the identifying information is received at a computer system. In one embodiment, the computer system comprises an audit application for receiving electronic transmissions (e.g., electronic messages) from the electronic device. In one embodiment, the computer system comprises an iCOD audit system comprising an iCOD audit application, and iCOD audit database, and an access key generator.

In one embodiment, the identifying information is comprised in shipping information transmitted from a manufacturing computer system (e.g., manufacturing IT system 105 of FIG. 1). In one embodiment, the identifying information is transmitted to the computer system upon the electronic device being shipped to a customer. In one embodiment, the identifying information uniquely identifies the electronic device. The identifying information may include, but is not limited to a serial number of the electronic device, a shipping date of the electronic device, and other identifying characteristics unique to the electronic device.

In one embodiment, the electronic device is an iCOD system (e.g., iCOD system 125 of FIG. 2) comprising at least one enabled component and at least one reserve component. In the present embodiment, the identifying information may also include characteristics of the iCOD system including the number of enabled CPUs and the number of reserve CPUs.

At step 310, an electronic transmission is received from the electronic device. In one embodiment, the electronic transmission is an electronic mail (email) message. At step 315, it is determined whether the electronic transmission is a request to access the electronic device. Provided the electronic transmission is not a request to access the electronic device, process 300 ends. Alternatively, provided the electronic transmission is a request to access the electronic device, process 300 proceeds to step 320.

In one embodiment, the request is a request to access a reserve CPU of an iCOD system (e.g., reserve CPU 210a of iCOD system 125 of FIG. 2). In one embodiment, the electronic transmission is manually generated by an individual (e.g., IT personnel or system contact). It should be appreciated that the electronic transmission must be transmitted from the electronic device, thus ensuring a viable email connection over which the status application can send electronic messages to an iCOD audit system (e.g., iCOD audit system 115 of FIG. 1).

At step 320, an access key is generated. In one embodiment, the access key is for providing access to the electronic device. In one embodiment, the access key is generated based on the identifying information received at step 305 such that the access key is unique to the electronic device.

Using the identification information to generate the access key ensures that the access key will only operate to allow access to the electronic device from which the request was sent. For example, with reference to FIG. 1, a request for an access key sent from iCOD system 125a to iCOD audit system 115 will generate an access key that is only operable on iCOD system 125a, and will not allow access to iCOD system 125b.

In one embodiment, an encryption algorithm is used for generating the access key. In the present embodiment, the identifying information is used to generate an access key that is specific to the electronic device. In one embodiment, the access key expires after a predetermined time period. In the present embodiment, upon the elapsing of a predetermined time period (e.g., six months or one year), it is necessary for a request for a new access key to be sent from the electronic device.

At step 325, the access key is transmitted to a system contact. In one embodiment, the system contact receives the access key in the body of an email sent to a computer system. In one embodiment, the computer system is distinct from the electronic device for which the access key is intended. In one embodiment, the system contact manually enters the access key into the electronic device. Upon entering the access key, the electronic device becomes fully operational. In one embodiment, a reserve CPU of an iCOD system is made fully accessible and operational upon receipt of the proper access key. Once the access key has been applied, the status and control agent can be used to control the reserve CPUs because it is now known that the status report is likely to be transmitted successfully from the electronic device.

Figure 4:
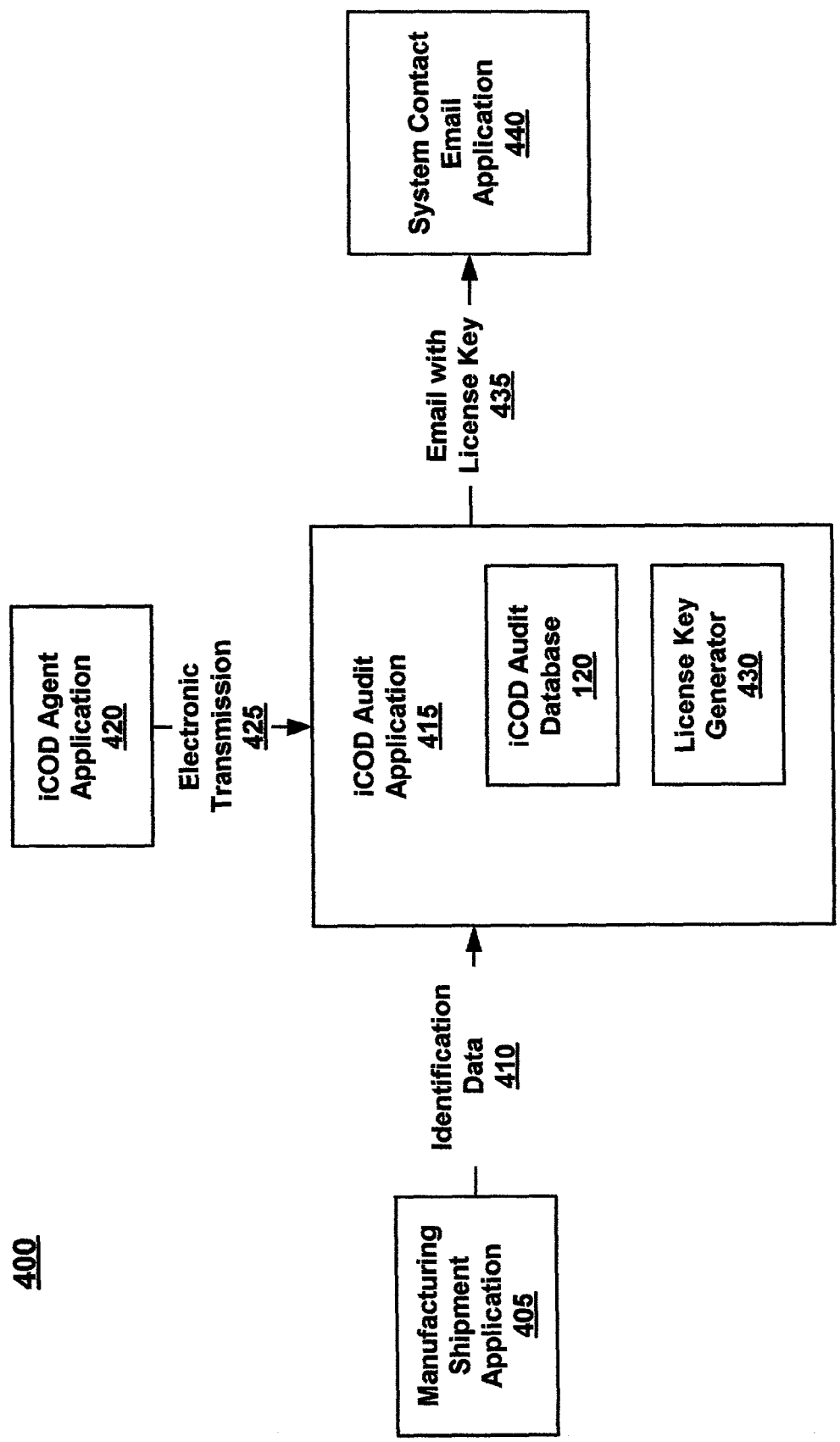
FIG. 4 is a data flow diagram illustrating data flow to and from an iCOD audit application in accordance with one embodiment of the present invention.

FIG. 4 is a data flow diagram 400 illustrating data flow to and from an iCOD audit application in accordance with one embodiment of the present invention. Upon the shipment of an iCOD system (e.g., iCOD system 125 of FIG. 2), manufacturing shipment application 405 transmits iCOD system identification data (e.g., identifying information) 410 to iCOD audit application 415. In one embodiment, manufacturing shipment application 405 is comprised within a manufacturing IT system (e.g., manufacturing IT system 105 of FIG. 1). In one embodiment, iCOD system identification data 410 comprises identification data that uniquely identifies the shipped iCOD system.

Upon receiving iCOD system identification data 410, iCOD audit application 415 stores iCOD system identification data 410 in iCOD audit database 120. In one embodiment, iCOD audit application 415 is comprised within an iCOD audit system (e.g., iCOD audit system 115 of FIG. 1).

In one embodiment, at a time after iCOD system identification data 410 is received, iCOD audit application receives electronic transmission 425 from iCOD application agent 420 (e.g., status agent 220a of FIG. 2). ICOD application agent 420 is comprised within an iCOD system. In one embodiment, electronic transmission 425 is a request for access to the iCOD system. In the present embodiment, license key generator 430 generates a license key for allowing access to the iCOD system that transmitted the access request.

Upon generating the license key, email 435 is transmitted to system contact email application 440. Email 435 comprises the license key for providing access to the iCOD system. Upon receipt of email 435, in one embodiment, the system contact manually enters the license key into the iCOD system. Upon entering the access key, the electronic device becomes fully operational.

The preferred embodiment of the present invention, a method for electronic tracking of an electronic device, is thus described. While the present invention has been described in particular embodiments, it should be appreciated that the present invention should not be construed as limited by such embodiments, but rather construed according to the below claims.

What is claimed is:

1. A method for electronic tracking of an electronic device, said method comprising:
   receiving identifying information about said electronic device, said identifying information uniquely identifying said electronic device from other electronic devices;
   receiving an electronic transmission from said electronic device over a network connection; and
   provided said electronic transmission is a request to access a processor of said electronic device, transmitting an access key to a system contact, wherein said access key is for providing access to said processor.

2. The method as recited in claim 1 wherein said electronic device is an instant capacity on demand computer system comprising at least one enabled processor and at least one reserve processor.

3. The method as recited in claim 2 wherein said request is a request to access said reserve processor.

4. The method as recited in claim 1 wherein said electronic transmission is an electronic mail message.

5. The method as recited in claim 1 wherein said access key is generated based on said identifying information such that said access key is unique to said electronic device.

6. The method as recited in claim 1 wherein said electronic transmission is manually generated by said system contact.

7. The method as recited in claim 1 wherein said access key expires after a predetermined time period.

8. The method as recited in claim 1 wherein said receiving an electronic transmission from said electronic device is performed by an audit application of a computer system, said electronic transmission comprising status information of said electronic device.

9. The method as recited in claim 1 wherein said identifying information is comprised in shipping information transmitted from a manufacturing computer system.

10. A computer-readable medium having computer-readable program code embodied therein for causing a computer system to perform a method for electronic monitoring of an electronic device, said method comprising:
    accessing identification data of said electronic device, said identification data uniquely identifying said electronic device from other electronic devices;
    accessing an electronic message from said electronic device, wherein said electronic message is received at said computer system over a network connection; and
    provided said electronic message is a request to access a processor of said electronic device, sending a license key to a system contact, wherein said license key is for providing access to said processor of said electronic device.

11. The computer-readable medium as recited in claim 10 wherein said electronic device is an instant capacity on demand computer system comprising at least one enabled CPU and at least one reserve CPU.

12. The computer-readable medium as recited in claim 10 wherein said license key is generated based on said identification data such that said license key is unique to said electronic device.

13. The computer-readable medium as recited in claim 10 wherein said electronic message is manually generated by said system contact.

14. The computer-readable medium as recited in claim 10 wherein said license key expires after a predetermined time period.

15. The computer-readable medium as recited in claim 10 wherein said computer system comprises an audit application for accessing an electronic message from said electronic device, said electronic message comprising status information of said electronic device.

16. A computer system comprising:
a bus;
a computer-readable memory coupled to said bus; and
a processor coupled to said bus, said processor for performing a method for electronic tracking of an instant capacity on demand computer system, said method comprising:
receiving identifying information about said instant capacity on demand computer system wherein said instant capacity on demand computer system comprises at least one enabled processor and at least one reserve processor, said identifying information uniquely identifying said instant capacity on demand computer system from other instant capacity on demand computer systems;
receiving an electronic transmission from said instant capacity on demand computer system over a network connection; and
provided said electronic transmission is a request to access said reserve processor, transmitting an access key to a system contact, wherein said access key is for providing access to said reserve processor.

17. The computer system as recited in claim 16 wherein said access key is generated based on said identifying information such that said access key is unique to said instant capacity on demand computer system.

18. The computer system as recited in claim 16 wherein said electronic transmission is manually generated by said system contact.

19. The computer system as recited in claim 16 wherein said access key expires after a predetermined time period.

20. The computer system as recited in claim 16 wherein said computer system comprises an audit application for receiving an electronic transmission from said instant capacity on demand computer system, said electronic transmission comprising status information of said instant capacity on demand computer system.

21. The computer system as recited in claim 16 wherein said identifying information is comprised in shipping information transmitted from a manufacturing computer system.

* * * * *